(12) United States Patent
Akl et al.

(10) Patent No.: US 11,641,682 B2
(45) Date of Patent: May 2, 2023

(54) SCHEDULING COORDINATION IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Franklin Park, NJ (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/249,631

(22) Filed: Mar. 8, 2021

(65) Prior Publication Data
US 2021/0289571 A1 Sep. 16, 2021

Related U.S. Application Data

(60) Provisional application No. 62/989,396, filed on Mar. 13, 2020.

(51) Int. Cl.
*H04W 76/14* (2018.01)
*H04W 28/02* (2009.01)
*H04W 72/12* (2023.01)
*H04W 76/15* (2018.01)

(52) U.S. Cl.
CPC ....... *H04W 76/14* (2018.02); *H04W 28/0278* (2013.01); *H04W 72/1242* (2013.01); *H04W 76/15* (2018.02)

(58) Field of Classification Search
None
See application file for complete search history.

(56) References Cited

U.S. PATENT DOCUMENTS

| 2020/0146025 A1* | 5/2020 | Choi | H04W 72/1247 |
| 2021/0127293 A1* | 4/2021 | Hong | H04W 28/04 |

FOREIGN PATENT DOCUMENTS

| KR | 20200013576 A | 2/2020 |
| WO | WO-2020032578 A1 | 2/2020 |

OTHER PUBLICATIONS

"3rdGenerationPartnershipProject,TechnicalSpecificationGroupRadioAccessNetwork, StudyonIntegratedAccessandBackhaul(Release15)",3GPPDraft,TR38.874V0.7.0-FINAL-TRCH,3RDGenerationPartnershipProject(3GPP), Nov. 8, 2018(2018—(Year: 2018).*

(Continued)

*Primary Examiner* — Ajit Patel
*Assistant Examiner* — Pamit Kaur
(74) *Attorney, Agent, or Firm* — Harrity & Harrity, LLP

(57) ABSTRACT

A wireless node in a wireless multi-hop network may transmit, based at least in part on a change in multiplexing capability relating to communications on one or more radio link control (RLC) channels, information to at least one of a parent node or a child node that enables the at least one of the parent node or the child node to prioritize communications with the wireless node. The wireless node may transmit or receive communications prioritized according to the information with the at least one of the parent node or the child node.

29 Claims, 11 Drawing Sheets

(56) References Cited

OTHER PUBLICATIONS

"3rd Generation Partnership Project, Technical Specification Group Radio Access Network, Study on Integrated Access and Backhaul (Release 15)", 3GPP Draft, TR 38.874 V0.7.0-FINAL-TRCH, 3RD Generation Partnership Project (3GPP), Mobile Competence Centre, 650, Route Des Lucioles, F-06921, Sophia-Antipolis Cedex, France, Nov. 8, 2018 (Nov. 8, 2018), XP051591963, Nov. 28, 2018 (Nov. 28, 2018), pp. 1-111, Retrieved from the Internet: URL: http://www.3gpp.org/ftp/Email%5FDiscussions/RAN2/[RAN2%23104]/[104%2326][IAB]%20TR%2038%2E874/TR%2038874%20v070%20%2D%20final%20%2Dtrch%2Ezip. [Retrieved on Nov. 28, 2018] paragraph [06. 1]—paragraph [7. 3. 2] paragraph [0009]—paragraph [9.7.13], sections 8.2.2 and 8.2.4, figures 8.2.1-1a. b. 9.3.1 sections 7.3.1 and 7.3.2 section 9.2.1.
International Search Report and Written Opinion—PCT/US2021/070252—ISA/EPO—dated Jun. 29, 2021.

\* cited by examiner

SCHEDULING COORDINATION IN AN INTEGRATED ACCESS AND BACKHAUL NETWORK

CROSS-REFERENCE TO RELATED APPLICATION

This Patent Application claims priority to U.S. Provisional Patent Application No. 62/989,396, filed on Mar. 13, 2020, entitled "SCHEDULING COORDINATION IN AN INTEGRATED ACCESS AND BACKHAUL NETWORK," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for scheduling coordination in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node in a wireless multi-hop network, may include transmitting, based at least in part on a change in multiplexing capability relating to communications on one or more radio link control (RLC) channels, information to at least one of a parent node or a child node that enables the at least one of the parent node or the child node to prioritize communications with the wireless node; and transmitting or receiving communications prioritized according to the information with the at least one of the parent node or the child node.

In some aspects, a method of wireless communication, performed by a wireless node in a wireless multi-hop network, may include receiving information from at least one of a parent node or a child node associated with a change in multiplexing capability relating to communications on one or more RLC channels, and prioritizing communications with the at least one of the parent node or the child node based at least in part on the change in multiplexing capability.

In some aspects, a method of wireless communication, performed by a central unit in a wireless multi-hop network, may include receiving first information from a wireless node associated with a change in multiplexing capability relating to communications on one or more RLC channels, and transmitting second information, based at least in part on the first information, to at least one of a parent node or a child node of the wireless node that enables the at least one of the parent node or the child node to prioritize communications with the wireless node based at least in part on the change in multiplexing capability.

In some aspects, a wireless node in a wireless multi-hop network for wireless communication may include a memory and one or more processors operatively coupled to the memory. The memory and the one or more processors may be configured to determine, and transmit, based at least in part on a change in multiplexing capability relating to communications on one or more RLC channels, information to at least one of a parent node or a child node that enables the at least one of the parent node or the child node to prioritize communications with the wireless node; and transmit or receive communications prioritized according to the information with the at least one of the parent node or the child node.

In some aspects, a wireless node in a wireless multi-hop network for wireless communication may include a memory and one or more processors operatively coupled to the memory. The memory and the one or more processors may be configured to receive information from at least one of a parent node or a child node associated with a change in multiplexing capability relating to communications on one or more RLC channels, and prioritize communications with the at least one of the parent node or the child node based at least in part on the change in multiplexing capability.

In some aspects, a central unit in a wireless multi-hop network for wireless communication may include a memory and one or more processors operatively coupled to the memory. The memory and the one or more processors may be configured to receive first information from a wireless node associated with a change in multiplexing capability relating to communications on one or more RLC channels, and transmit second information, based at least in part on the first information, to at least one of a parent node or a child node of the wireless node that enables the at least one of the parent node or the child node to prioritize communications with the wireless node based at least in part on the change in multiplexing capability.

In some aspects, a non-transitory computer-readable medium may store one or more instructions for wireless communication. The one or more instructions, when executed by one or more processors of a wireless node in a wireless multi-hop network, may cause the one or more processors to transmit, based at least in part on a change in multiplexing capability relating to communications on one or more RLC channels, information to at least one of a parent node or a child node that enables the at least one of the parent node or the child node to prioritize communications with the wireless node; and transmit or receive communications prioritized according to the information with the at least one of the parent node or the child node.

In some aspects, a non-transitory computer-readable medium may store one or more instructions for wireless communication. The one or more instructions, when executed by one or more processors of a wireless node in a wireless multi-hop network, may cause the one or more processors to receive information from at least one of a parent node or a child node associated with a change in multiplexing capability relating to communications on one or more RLC channels, and prioritize communications with the at least one of the parent node or the child node based at least in part on the change in multiplexing capability.

In some aspects, a non-transitory computer-readable medium may store one or more instructions for wireless communication. The one or more instructions, when executed by one or more processors of a central unit in a wireless multi-hop network, may cause the one or more processors to receive first information from a wireless node associated with a change in multiplexing capability relating to communications on one or more RLC channels, and transmit second information, based at least in part on the first information, to at least one of a parent node or a child node of the wireless node that enables the at least one of the parent node or the child node to prioritize communications with the wireless node based at least in part on the change in multiplexing capability.

In some aspects, an apparatus for wireless communication may include means for transmitting, based at least in part on a change in multiplexing capability relating to communications on one or more RLC channels, information to at least one of a parent node or a child node that enables the at least one of the parent node or the child node to prioritize communications with the wireless node; and means for transmitting or receiving communications prioritized according to the information with the at least one of the parent node or the child node.

In some aspects, an apparatus for wireless communication may include means for receiving information from at least one of a parent node or a child node associated with a change in multiplexing capability relating to communications on one or more RLC channels, and means for prioritizing communications with the at least one of the parent node or the child node based at least in part on the change in multiplexing capability.

In some aspects, an apparatus for wireless communication may include means for receiving first information from a wireless node associated with a change in multiplexing capability relating to communications on one or more RLC channels, and means for transmitting second information, based at least in part on the first information, to at least one of a parent node or a child node of the wireless node that enables the at least one of the parent node or the child node to prioritize communications with the wireless node based at least in part on the change in multiplexing capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
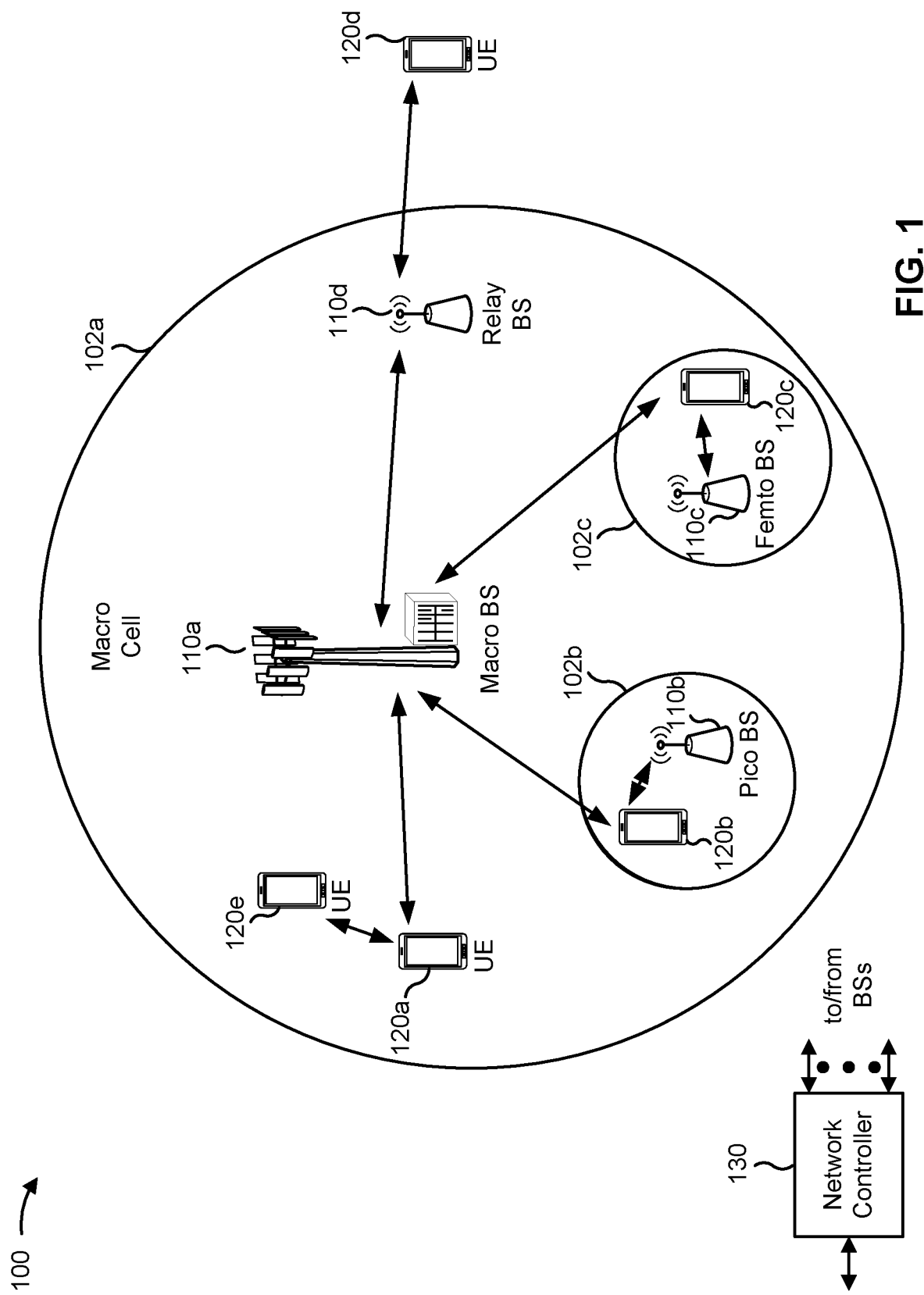
- FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
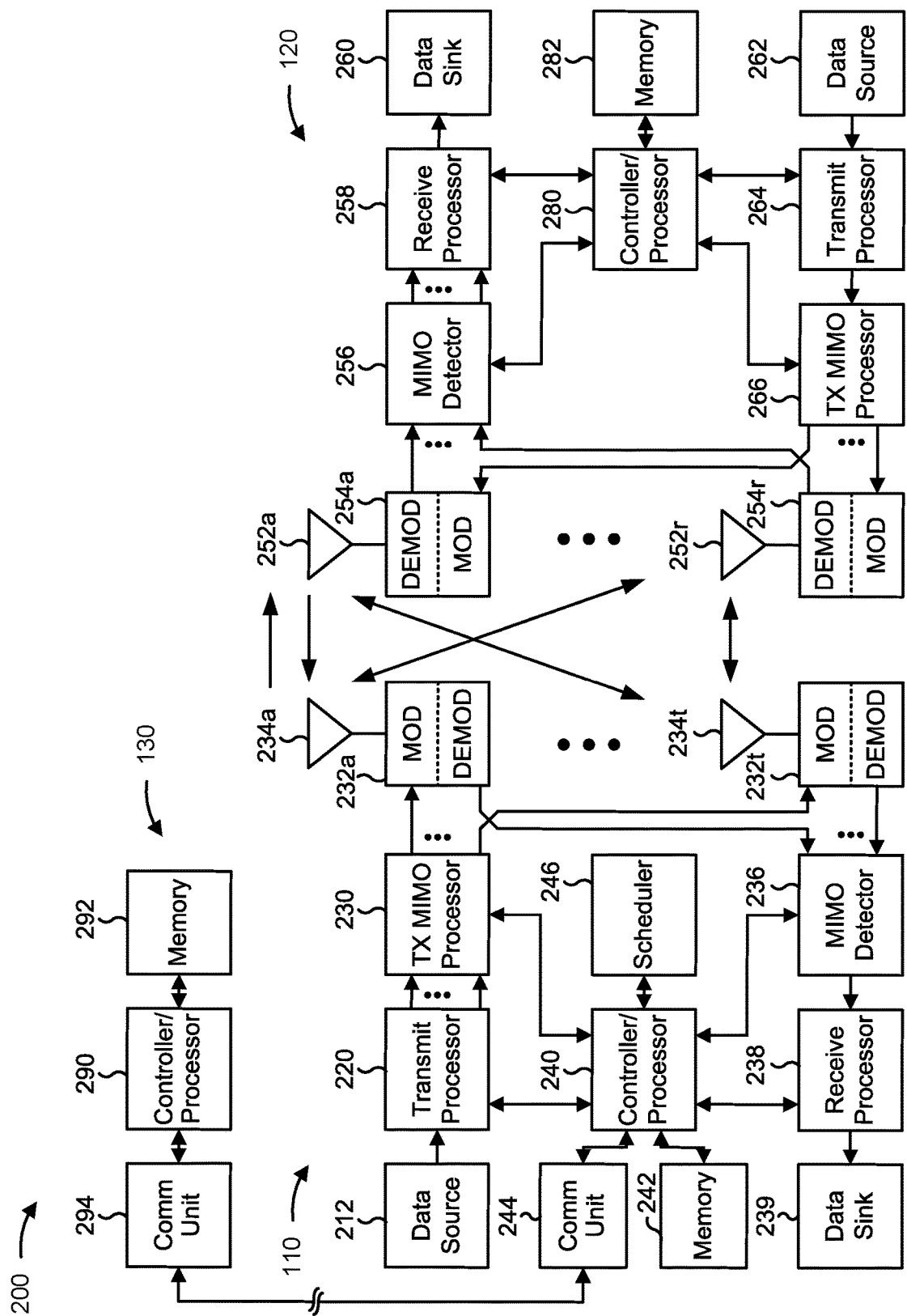
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with scheduling coordination in an IAB network, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless node (e.g., an IAB node, a base station 110, a UE 120, and/or the like) may include means for determining a change in multiplexing capability relating to communications on one or more RLC channels, means for transmitting, based at least in part on the change in multiplexing capability, information to at least one of a parent node or a child node that enables the at least one of the parent node or the child node to prioritize communications with the wireless node, means for transmitting or receiving communications prioritized according to the information with the at least one of the parent node or the child node, and/or the like. In some aspects, a wireless node (e.g., an IAB node, a base station 110, a UE 120, and/or the like) may include means for receiving information from at least one of a parent node or a child node associated with a change in multiplexing capability relating to communications on one or more RLC channels, means for prioritizing communications with the at least one of the parent node or the child node based at least in part on the change in multiplexing capability, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a central unit (e.g., an IAB donor, a base station 110, and/or the like) may include means for receiving first information from a wireless node associated with a change in multiplexing capability relating to communications on one or more RLC channels, means for transmitting second information, based at least in part on the first information, to at least one of a parent node or a child node of the wireless node that enables the at least one of the parent node or the child node to prioritize communications with the wireless node based at least in part on the change in multiplexing capability, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
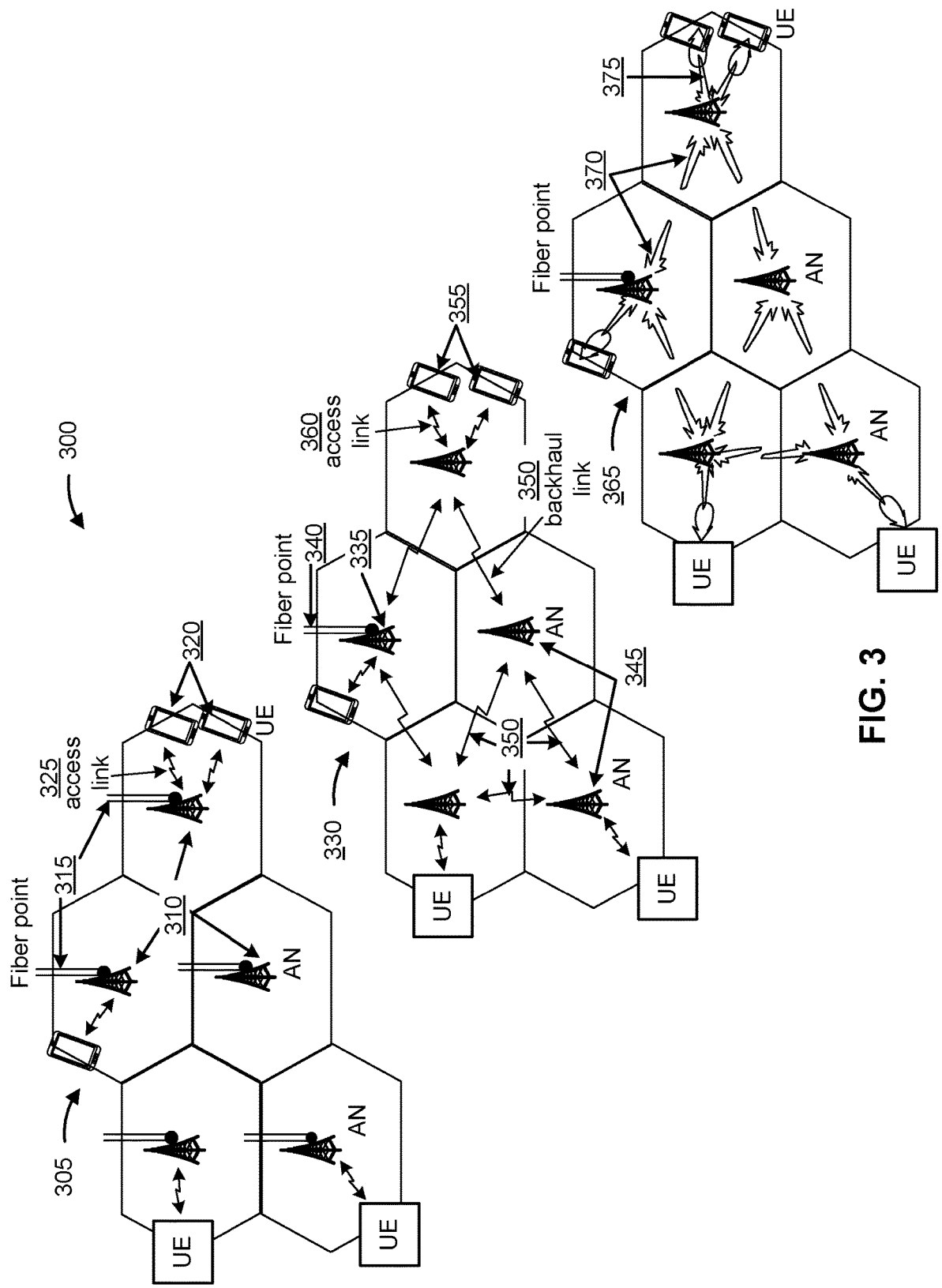
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
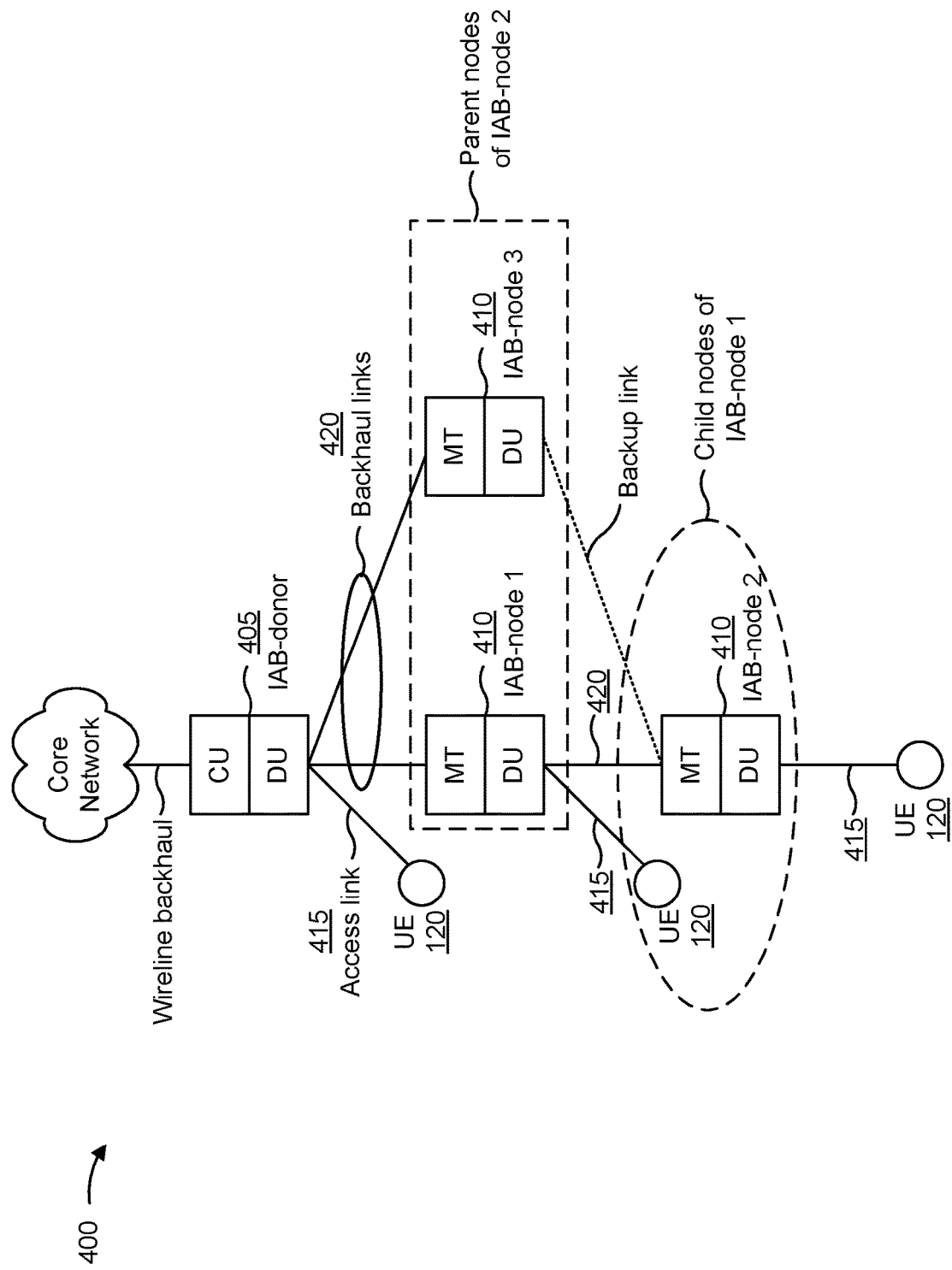
FIG. 4 is a diagram illustrating an example of an IAB network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

An access link 415 may include one or more access radio link control (RLC) channels. An access RLC channel may carry packet data convergence protocol (PDCP) communications (e.g., radio resource control (RRC) communications, data radio bearer communications, and/or the like) from a UE 120, or an MT function of an IAB node 410, to a DU function of an IAB donor 405 or an IAB node 410.

A backhaul link 420 may include one or more backhaul RLC channels. A backhaul RLC channel may carry bandwidth allocation protocol (BAP) communications (e.g., for backhauling of access traffic) from an MT function of an IAB node 410 to a DU function of an IAB donor 405 or an IAB node 410 (e.g., respective backhaul RLC channels may be between hops on a route from an access IAB node 410 and a DU function of an IAB donor 405). Accordingly, a radio bearer for access traffic of a UE 120, or an MT function of an IAB node 410, may be mapped to a backhaul RLC channel, which may be an existing backhaul RLC channel or a backhaul RLC channel that was established for the radio bearer. As a result, different mappings between radio bearers and backhaul RLC channels may be possible. For example, a particular backhaul RLC channel may be mapped to a single radio bearer or multiple radio bearers, such as two radio bearers or three radio bearers. Moreover a parent node may not have information on a particular mapping between radio bearers and RLC channels used by a child node, and a child node may not have information on a particular mapping between radio bearers and RLC channels used by a parent node.

As indicated above, FIG. 4 is provided as an example. Other examples may differ from what is described with regard to FIG. 4.

Figure 5A:
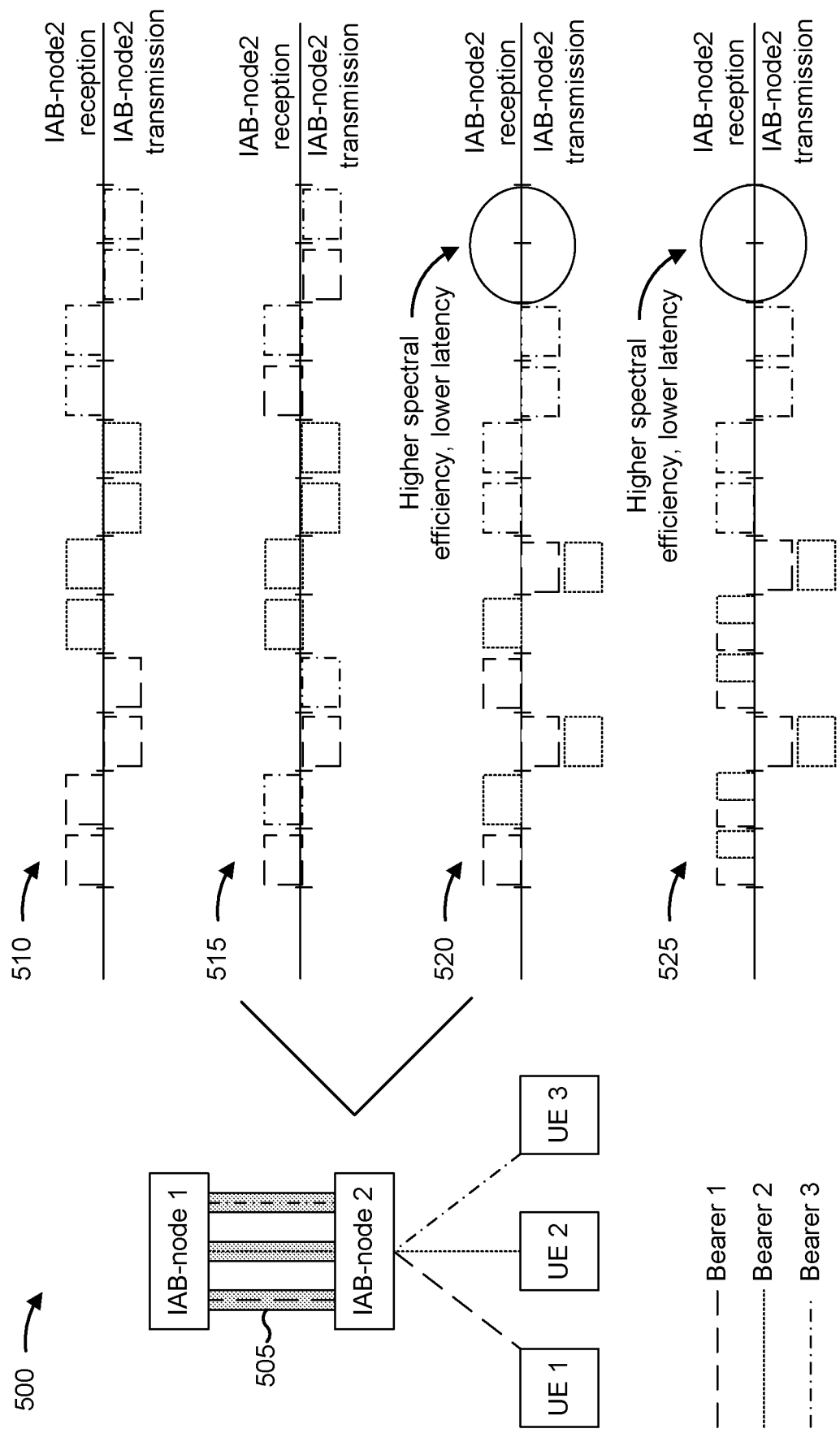
FIGS. 5A and 5B are diagrams illustrating examples of scheduling coordination in an IAB network, in accordance with the present disclosure.

FIG. 5A is a diagram illustrating an example 500 of scheduling coordination in an IAB network, in accordance with the present disclosure. As shown in FIG. 5A, a first IAB node (shown as IAB-node 1) and a second IAB node (shown as IAB-node 2) may communicate on multiple backhaul RLC channels 505. The backhaul RLC channels 505 may be used for backhauling of access traffic of a first UE (shown as UE 1), a second UE (shown as UE 2), and a third UE (shown as UE 3).

Traffic for the first UE may be associated with a first radio bearer (shown as Bearer 1), traffic for the second UE may be associated with a second radio bearer (shown as Bearer 2), and traffic for the third UE may be associated with a third radio bearer (shown as Bearer 3). As shown, the first radio bearer may be mapped to a first RLC channel 505 between the first and second IAB nodes, the second radio bearer may be mapped to a second RLC channel 505 between the first and second IAB nodes, and the third radio bearer may be mapped to a third RLC channel 505 between the first and second IAB nodes. In other words, the mapping between the radio bearers and the RLC channels 505 may be 1:1.

Traffic schedule 510 and traffic schedule 515 show examples of scheduling for the second IAB node, by the first IAB node, when the first IAB node lacks information relating to a spatial division multiplexing (SDM) capability of the second IAB node. Schedules 510 and 515 show that, without information relating to an SDM capability of the second IAB node, the first IAB node may schedule transmissions from the second IAB node to the UEs to occur over two slots. For example, as shown by schedule 510, the second IAB node may be scheduled to receive, from the first IAB node, data for the first UE in a first and second slot, scheduled to transmit the data to the first UE in a third and fourth slot, scheduled to receive, from the first IAB node, data for the second UE in a fifth and sixth slot, scheduled to transmit the data to the second UE in a seventh and eighth slot, and so forth. Such scheduling may reduce spectral efficiency, increase latency, and/or the like.

Some techniques and apparatuses described herein enable communication of an SDM capability between nodes, thereby increasing spectral efficiency, decreasing latency, and/or the like. Traffic schedule 520 and traffic schedule 525 show examples of scheduling for the second IAB node, by the first IAB node, when the first IAB node has information relating to an SDM capability of the second IAB node. Schedules 520 and 525 show that, with information that the second IAB node is capable of SDM for communications on the first RLC channel 505 (carrying traffic for the first UE) and the second RLC channel 505 (carrying traffic for the second UE), the first IAB node may schedule transmissions from the second IAB node to the first and second UEs to occur in one slot. For example, as shown by schedule 520, the second IAB node may be scheduled to receive, from the first IAB node, data for the first UE in a first slot and data for the second UE in a second slot, scheduled to transmit the data to the first UE and the second UE (e.g., in an SDM manner) in a third slot, and so forth.

As indicated above, FIG. 5A is provided as an example. Other examples may differ from what is described with regard to FIG. 5A.

Figure 5B:
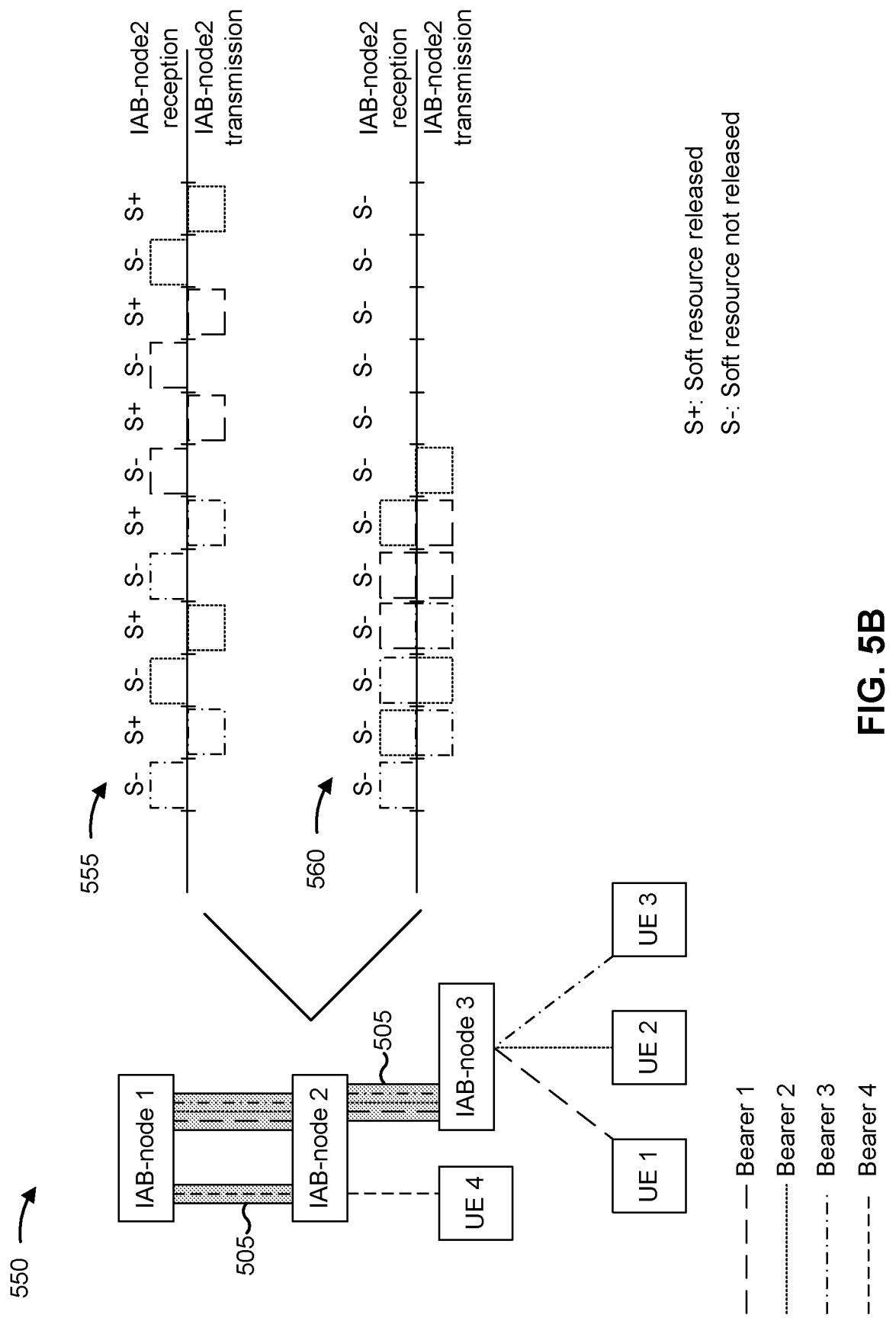

FIG. 5B is a diagram illustrating an example 550 of scheduling coordination in an IAB network, in accordance with the present disclosure. As shown in FIG. 5B, a first IAB node (shown as IAB-node 1) and a second IAB node (shown as IAB-node 2) may communicate on multiple backhaul RLC channels 505. The backhaul RLC channels 505 between the first and second IAB nodes may be used for backhauling of access traffic of a first UE (shown as UE 1), a second UE (shown as UE 2), a third UE (shown as UE 3), and a fourth UE (shown as UE 4). As also shown in FIG. 5B, the second IAB node and a third IAB node (shown as IAB-node 3) also may communicate on a backhaul RLC channel 505. The backhaul RLC channel 505 between the second and third IAB nodes may be used for backhauling of access traffic of the first UE, the second UE, and the third UE.

Traffic for the first UE may be associated with a first radio bearer (shown as Bearer 1), traffic for the second UE may be associated with a second radio bearer (shown as Bearer 2), traffic for the third UE may be associated with a third radio bearer (shown as Bearer 3), and traffic for the fourth UE may be associated with a fourth radio bearer (shown as Bearer 4). As shown, the first, second, and third radio bearers may be mapped to a first RLC channel 505 (e.g., a 3:1 mapping) between the first and second IAB nodes, and the fourth radio bearer may be mapped to a second RLC channel 505 between the first and second IAB nodes (e.g., a 1:1 mapping). As shown, the first, second, and third radio bearers also may be mapped to an RLC channel 505 (e.g., a 3:1 mapping) between the second and third IAB nodes.

Traffic schedule 555 shows an example of scheduling for the second IAB node, by the first IAB node, when the first IAB node lacks information relating a full duplexing (FD) capability of the second IAB node. Schedule 555 shows that, without information relating to an FD capability of the second IAB node, the first IAB node may schedule reception and transmission of the second IAB node to occur in alternating slots (e.g., a reception and a transmission do not occur in the same slot). For example, as shown by schedule 555, the second IAB node may be scheduled to receive, from the first IAB node, data for the third UE in a first slot, scheduled to transmit the data to the third UE in a second slot, scheduled to receive, from the first IAB node, data for the second UE in a third slot, scheduled to transmit the data to the second UE in a fourth slot, and so forth. Such scheduling may reduce spectral efficiency, increase latency, and/or the like.

Some techniques and apparatuses described herein enable communication of an FD capability between nodes, thereby increasing spectral efficiency, decreasing latency, and/or the like. Traffic schedule 560 shows an example of scheduling for the second IAB node, by the first IAB node, when the first IAB node has information relating an FD capability of the second IAB node. Schedule 560 shows that, with information that the second IAB node is capable of FD for communications on the first RLC channel 505 between the first and second IAB nodes (carrying traffic for the first, second, and third UEs) and the RLC channel 505 between the second and third IAB nodes (carrying traffic for the first, second, and third UEs), the first IAB node may schedule a reception and a transmission of the second IAB node to occur in the same slot. For example, as shown by schedule 560, the second IAB node may be scheduled to receive, from the first IAB node, data for the third UE in a first slot, scheduled to receive, from the first IAB node, data for the second UE in a second slot and transmit the data for the third UE in the second slot (e.g., concurrently), scheduled to receive, from the first IAB node, data for the third UE in a third slot and transmit the data for the second UE in the third slot (e.g., concurrently), and so forth.

As indicated above, FIG. 5B is provided as an example. Other examples may differ from what is described with regard to FIG. 5B.

Figure 6:
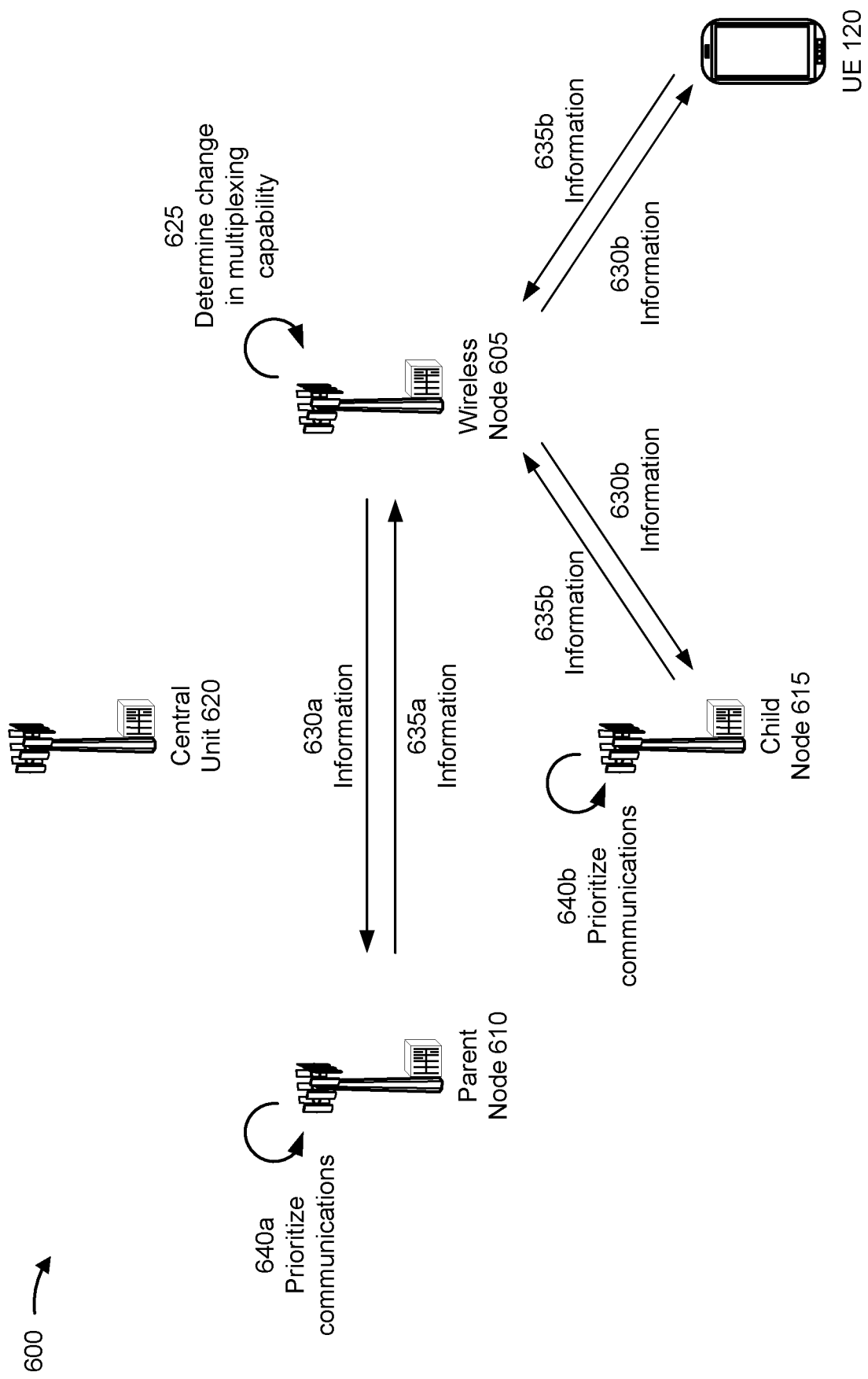
FIGS. 6 and 7 are diagrams illustrating examples of scheduling coordination in an IAB network, in accordance with the present disclosure.

FIG. 6 is a diagram illustrating an example 600 of scheduling coordination in an IAB network, in accordance with the present disclosure. In particular, FIG. 6 shows communication between nodes of a wireless multi-hop network. For example, the wireless multi-hop network includes a wireless node 605, a parent node 610 (e.g., which schedules the wireless node 605), a child node 615 (e.g., which is scheduled by the wireless node 605), a UE 120 (e.g., which is served by one or more of the wireless node 605, the parent node 610, or the child node 615), and a central unit 620. In some aspects, the wireless multi-hop network is an IAB network, as described above. In this example, the wireless node 605, the parent node 610, and the child node 615 may be IAB nodes (e.g., IAB-nodes 410), and the central unit 620 may include a CU function of an IAB donor (e.g., IAB-donor 405).

In some aspects, the wireless multi-hop network may include additional nodes to those shown in FIG. 6. For example, the wireless node 605 may be associated with one or more additional parent nodes, one or more additional child nodes, may serve one or more additional UEs, and/or the like. In some aspects, the child node 615 may be a UE and/or the parent node 610 may be a DU function of an IAB donor.

As shown by reference number 625, the wireless node 605 may determine a change in multiplexing capability of the wireless node 605. The change in multiplexing capability may relate to an SDM capability and/or an FD capability. In SDM, the wireless node 605 may use multiple beams to concurrently transmit or receive communications with multiple child nodes (e.g., concurrently transmit to a first child node using a first beam and to a second child node using a second beam), or with a child node and the parent node 610 (e.g., concurrently receive from a child node using a first beam and from a parent node using a second beam). For example, the wireless node 605 may serve one or more UEs 120, and due to movement of the UEs 120 into a particular spatial arrangement, the wireless node 605 may determine that communications for one or more of the UEs 120 may use SDM. In FD, the wireless node 605 may concurrently transmit and receive communications with multiple child nodes (e.g., concurrently transmit to a first child node and receive from a second child node), or with a child node and the parent node 610 (e.g., concurrently transmit to a child node and receive from a parent node). The change in multiplexing capability may be a gain of the multiplexing capability or a loss of the multiplexing capability.

The change in multiplexing capability may relate to communications (e.g., traffic) of the wireless node 605 on one or more access links (e.g., with one or more child nodes, such as child node 615, one or more UEs 120, and/or the like) and/or a backhaul link (e.g., with child node 615, parent node 610, and/or the like). For example, the wireless node 605 may determine the change in multiplexing capability with respect to one or more RLC channels between the wireless node 605 and the parent node 610 (e.g., backhaul RLC channels and/or access RLC channels), one or more RLC channels between the wireless node 605 and the child node 615 (e.g., backhaul RLC channels and/or access RLC channels), and/or one or more RLC channels between the wireless node 605 and one or more UEs 120 (e.g., access RLC channels).

As shown by reference number 630a, the wireless node 605 may transmit, and the parent node 610 may receive, information associated with prioritizing communications. In some aspects, the wireless node 605 may transmit the information to the parent node 610 via uplink control information (UCI), a medium access control control element (MAC-CE), and/or the like. In some aspects, the wireless node 605 may transmit the information according to a configuration that provides a time interval for transmitting the information (e.g., the information is transmitted periodically according to the time interval) or a condition for transmitting the information (e.g., the information is transmitted upon a determination of a change in multiplexing capability). In some aspects, the central unit 620 may transmit the configuration to the wireless node 605 via an RRC message, an F1AP message, and/or the like.

In some aspects, the information may indicate one or more RLC channels (e.g., ingress RLC channels or egress RLC channels at the wireless node 605) on which communications may be multiplexed (e.g., if the change in multiplexing capability is a gain) or may no longer be multiplexed (e.g., if the change in multiplexing capability is a loss). As described above, a radio bearer associated with communications of a UE 120 may be mapped to an RLC channel. Accordingly, for example, if the wireless node 605 determines that communications for a first UE 120, associated with a first radio bearer, and a second UE 120, associated with a second radio bearer, may be multiplexed, the information may indicate the RLC channel(s) mapped to the first radio bearer and the second radio bearer. An RLC channel may be identified in the information by an RLC channel identifier, a logical channel identifier (LCID) that is mapped to the RLC channel, and/or the like. In some aspects, an RLC channel may be identified in the information by a pointer (e.g., an index value) that maps to the RLC channel.

In some aspects, the information may indicate an association among a set of RLC channels. The association between the set of RLC channels may indicate that communications (e.g., protocol data units (PDUs)) for the set of RLC channels may be multiplexed over one instance, or multiple consecutive instances, of scheduling the wireless node 605.

In some aspects, the information may indicate one or more RLC channels that are associated with an SDM capability of the wireless node 605. The SDM capability may relate to one or more links (e.g., for single user MIMO or multiple user MIMO) to child nodes served by the wireless node 605 (e.g., child node 615, one or more UEs 120, and/or the like) and/or to the link with the parent node 610. In some aspects, the information may indicate one or more RLC channels that are associated with an FD capability of the wireless node 605. The FD capability may relate to one or more links to child nodes served by the wireless node 605 (e.g., child node 615, one or more UEs 120, and/or the like) and/or to the link with the parent node 610.

In some aspects, the information may indicate an uplink buffer status for one or more child nodes (e.g., child node 615, one or more UEs 120, and/or the like) served by the wireless node 605. For example, child node 615 or a UE 120 may report an uplink buffer status to the wireless node 605, and the wireless node 605 may indicate the uplink buffer status to the parent node 610. In some aspects, the information may indicate an association between one or more uplink buffer statuses and one or more RLC channels between the wireless node 605 and the parent node 610. An uplink buffer status may indicate that a child node has data to transmit, and therefore the parent node 610 may determine that priority is to be given to communications on an RLC channel associated with the uplink buffer status, such as when the communications are to be multiplexed.

In some aspects, the information may indicate a rate at which the wireless node 605 is capable of communicating with one or more child nodes served by the wireless node 605 (e.g., child node 615, one or more UEs 120, and/or the like). The rate may be used by the parent node 610 to schedule communications for the wireless node 605 (e.g., on the link with the wireless node 605 or on one or more RLC channels with the wireless node 605) such that the rates of incoming and outgoing traffic at the wireless node 605 correspond. The wireless node 605 may indicate the rate by indicating a particular MCS. Additionally, or alternatively, the wireless node 605 may indicate the rate by indicating one or more channel quality metrics (e.g., channel quality information) associated with the rate. The channel quality metrics may include a self-interference measurement for the wireless node 605.

The indicated rate may relate to a particular RLC channel (e.g., the information may indicate an association between the indicated rate and a particular RLC channel). Accordingly, the information may indicate respective rates for one or more RLC channels between the wireless node 605 and the parent node 610. Moreover, the indicated rate may relate to a particular multiplexing mode of the wireless node 605. For example, the wireless node 605 may indicate a first rate at which the wireless node 605 is capable of communicating with a child node when communications for the child node are not to be multiplexed, a second rate at which the wireless node 605 is capable of communication with the child node when communications for the child node are to be multiplexed, and/or the like. In some aspects, the wireless node 605 may indicate a first rate at which the wireless node 605 is capable of communication with a child node when communications for the child node are to be multiplexed using SDM, a second rate at which the wireless node 605 is capable of communication with the child node when communications for the child node are to be multiplexed using FD, and/or the like.

As shown by reference number 630b, the wireless node 605 may transmit, and a child node (e.g., child node 615, one or more UEs 120, and/or the like) may receive, information associated with prioritizing communications. In some aspects, the wireless node 605 may transmit the information to the child node via downlink control information (DCI), a MAC-CE, and/or the like. In some aspects, the wireless node 605 may transmit the information according to a configuration that provides a time interval or a condition for transmitting the information, as described above. In some aspects, the wireless node 605 may transmit the information to the child node in a scenario in which the wireless node 605 is multi-connected (e.g., the wireless node 605 has multiple parent nodes).

In some aspects, the information may indicate that a set of rules, used by the child node (e.g., child node 615, one or more UEs 120, and/or the like) to select data for transmission to the wireless node 605, is to be modified. For example, the child node may use the rules to determine one or more particular RLC channels, for which data is to be transmitted, during a scheduled uplink transmission of the child node. The information may indicate a particular modification for the set of rules. The particular modification may prioritize communications of the child node such that the wireless node 605 may use SDM and/or FD on the link with the child node and/or the link with the parent node 610.

As shown by reference number 635a, the parent node 610 may transmit (e.g., via DCI, a MAC-CE, and/or the like), and the wireless node 605 may receive, other information associated with prioritizing communications. In some aspects, the other information may indicate one or more scheduling options for the wireless node 605. For example, the other information may indicate one or more RLC channels for which the parent node 610 has data to transmit to the wireless node 605, so that the wireless node 605 may prioritize the RLC channels (e.g., according to an SDM capability and/or an FD capability of the wireless node 605).

In some aspects, the other information may indicate a downlink buffer status for the parent node 610. In some aspects, the other information may indicate an association between one or more downlink buffer statuses and one or more RLC channels between the wireless node 605 and the parent node 610. A downlink buffer status may indicate that the parent node 610 has data to transmit to the wireless node 605, and therefore the wireless node 605 may determine that priority is to be given to communications on an RLC channel associated with the downlink buffer status, such as when the communications are to be multiplexed.

In some aspects, the other information transmitted by the parent node 610 may be in addition to, or instead of, the information transmitted by the wireless node 605 (e.g., as described in connection with reference number 630a). In some aspects, the parent node 610 may transmit the other information before information is transmitted by the wireless node 605. In this case, the wireless node 605 may determine the information that is to be transmitted by the wireless node 605 (e.g., as described in connection with reference number 630a) based at least in part on the other information transmitted by the parent node 610. For example, the wireless node 605 may determine one or more RLC channels that are to be given priority based at least in part on one or more scheduling options and/or one or more downlink buffer statuses indicated by the parent node 610.

As shown by reference number 635b, a child node (e.g., child node 615, one or more UEs 120, and/or the like) may transmit (e.g., via UCI, a MAC-CE, and/or the like), and the wireless node 605 may receive, other information associated with prioritizing communications. In some aspects, the other information may provide one or more of the indications described above that may be transmitted by the wireless node 605 to the parent node 610 (e.g., as described in connection with reference number 630a). In other words, the wireless node 605 is a parent node to the child node (e.g., child node 615), and the child node may transmit information that is described above as being transmitted to the parent node 610.

In some aspects, the other information transmitted by the child node may be in addition to, or instead of, the information transmitted by the wireless node 605 (e.g., as described in connection with reference number 630a or 630b). In some aspects, the child node may transmit the other information before information is transmitted by the wireless node 605. In this case, the wireless node 605 may determine the information that is to be transmitted by the wireless node 605 (e.g., as described in connection with reference number 630a) based at least in part on the other information transmitted by the child node. For example, the child node may transmit the other information to the wireless node 605 indicating one or more first RLC channels that are to be given priority, and the wireless node 605 may transmit the information to the parent node 610 indicating one or more second RLC channels that are to be given priority based at least in part on the one or more first RLC channels (e.g., according to a mapping of the one or more first RLC channels to the one or more second RLC channels).

As shown by reference number 640a, the parent node 610 may prioritize communications with the wireless node 605 based at least in part on the change in multiplexing capability of the wireless node 605 (e.g., according to the information transmitted by the wireless node 605). For example, the wireless node 605 may transmit or receive communications prioritized according to the information with the parent node. For example, the parent node 610 may modify scheduling of the wireless node 605 based at least in part on the information transmitted by the wireless node 605. As an example, the parent node 610 may schedule the wireless node 605 such that communications (e.g., PDUs) of the wireless node 605 may be multiplexed (e.g., according to the change in multiplexing capability).

In some aspects, PDUs of the wireless node 605 for one or more RLC channels may be multiplexed in a single medium access control (MAC) transport block (e.g., in a single transmission time interval (TTI), such as a slot), or multiplexed in multiple MAC transport blocks. That is, the parent node 610 may modify the scheduling for a single TTI or multiple TTIs based at least in part on the information transmitted by the wireless node 605.

In some aspects, such as when the information indicates that one or more RLC channels are associated with an SDM capability, the parent node 610 may schedule the wireless node 605 to transmit multiple communications (e.g., PDUs) on the one or more RLC channels in a single TTI (e.g., a single slot). That is, the wireless node 605 may use SDM to transmit the multiple communications in the single TTI. In this case, the parent node 610 may schedule the wireless node 605 to receive the multiple communications that are to be transmitted in one or more TTIs preceding the single TTI (e.g., as shown in schedule 520 or schedule 525 of FIG. 5A). In this way, spectral efficiency may be improved.

In some aspects, such as when the information indicates that one or more RLC channels are associated with an FD capability, the parent node 610 may modify a release of soft resources to the wireless node 605. For example, the parent node 610 may not release soft resources to the wireless node 605 because a reception and a transmission of the wireless node 605 may occur in the same TTI (e.g., as shown in FIG. 5B, in which S+ represents a soft resource that is released, and S− represents a soft resource that is not released). In this way, signaling overhead relating to the release of soft resources may be reduced.

In some aspects, such as when the information indicates that one or more RLC channels are associated with an FD capability, the parent node 610 may schedule the wireless node 605 to receive multiple communications (e.g., PDUs) for the one or more RLC channels in consecutive TTIs (e.g., consecutive slots). Accordingly, the wireless node 605 may transmit a communication, of the multiple communications, to a child node in a TTI that immediately follows the TTI in which the communication is received (e.g., as shown in schedule 560 of FIG. 5B). In this way, latency may be reduced, which may be useful for ultra-reliable low-latency communication (URLLC).

As shown by reference number 640b, a child node (e.g., child node 615, one or more UEs 120, and/or the like) may prioritize communications with the wireless node 605 based at least in part on the change in multiplexing capability of the wireless node 605 (e.g., according to the information transmitted by the wireless node 605). For example, the wireless node 605 may transmit or receive communications prioritized according to the information with the child node. For example, the child node may select data for transmission on one or more RLC channels according to modified rules for selecting data (e.g., according to the information transmitted by the wireless node 605).

As indicated above, FIG. 6 is provided as an example. Other examples may differ from what is described with respect to FIG. 6.

Figure 7:
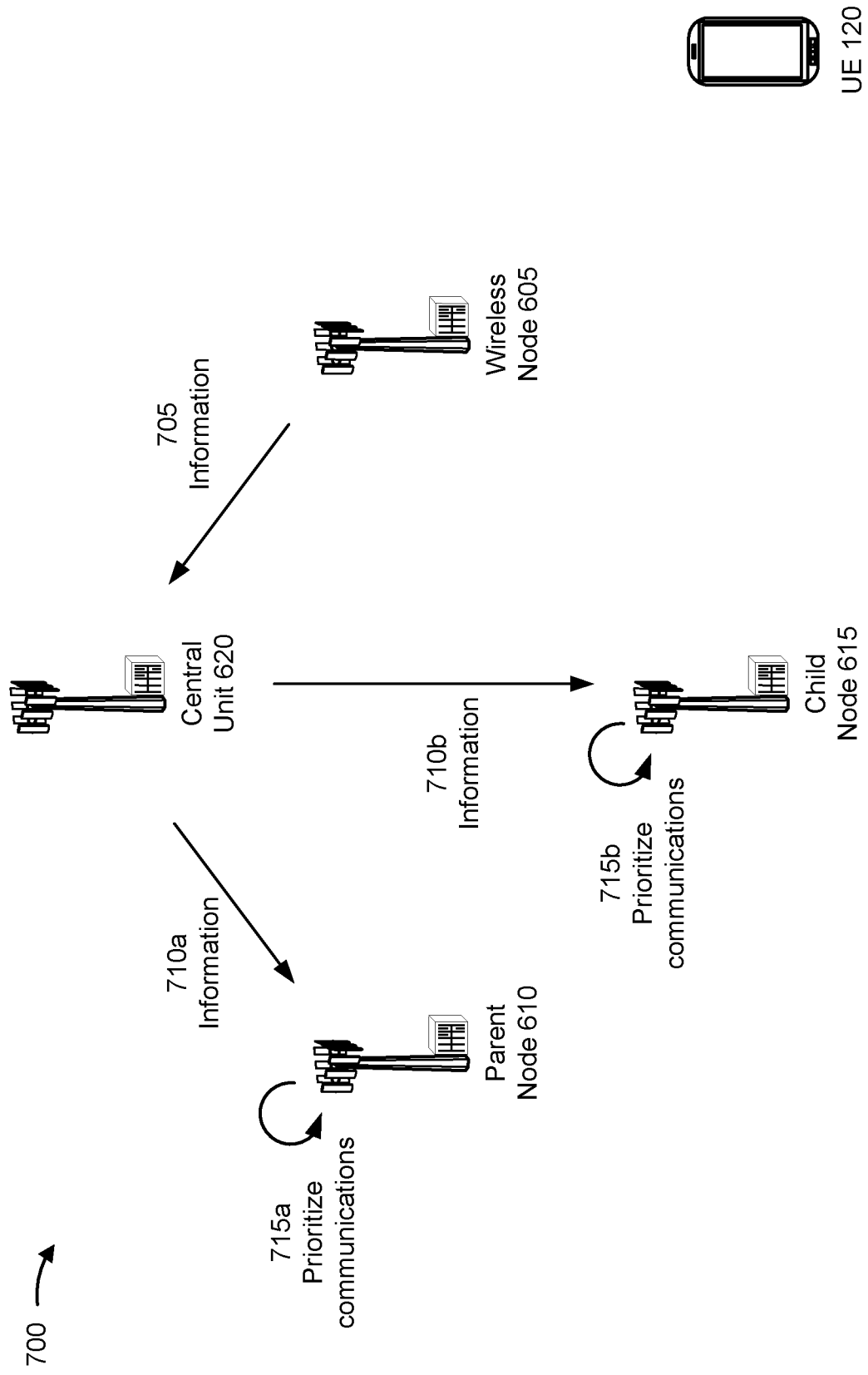

FIG. 7 is a diagram illustrating an example 700 of scheduling coordination in an IAB network, in accordance with the present disclosure. In particular, FIG. 7 shows communication between nodes of a wireless multi-hop network, as described in connection with FIG. 6.

As shown by reference number 705, the wireless node 605 may transmit, and the central unit 620 may receive, first information associated with prioritizing communications. The wireless node 605 may transmit the first information based at least in part on determining a change in a multiplexing capability of the wireless node 605, as described in connection with FIG. 6. In some aspects, the wireless node 605 may transmit the first information via an RRC message, an F1AP message, and/or the like. In some aspects, the wireless node 605 may transmit the first information according to a configuration that provides a time interval or a condition for transmitting the first information, as described in connection with FIG. 6.

The first information may be as described in connection with FIG. 6. For example, the first information may indicate one or more RLC channels (e.g., ingress RLC channels or egress RLC channels at the wireless node 605) on which communications may be multiplexed or may no longer be multiplexed, an association among a set of RLC channels, one or more RLC channels associated with an SDM capability and/or an FD capability, a rate at which the wireless node 605 is capable of communicating with one or more child nodes served by the wireless node 605, and/or the like.

As shown by reference numbers 710a and 710b, the central unit 620 may transmit, and the parent node 610 and/or the child node 615 may receive, second information associated with prioritizing communications. The second information may be based at least in part on the first information received from the wireless node 605. That is, the second information may provide one or more indications indicated by the first information. For example, the second information may indicate one or more RLC channels between the parent node 610 and the wireless node 605 (e.g., when the second information is transmitted to the parent node 610), or one or more RLC channels between the child node 615 and the wireless node 605 (e.g., when the second information is transmitted to the child node 615), on which communications may be multiplexed or may no longer be multiplexed. In addition, the second information may indicate that the one or more indications are associated with the wireless node 605. In this way, the wireless node 605 may transmit information, as described above, to the parent node 610 or the child node 615 via the central unit 620.

As shown by reference numbers 715a and 715b, the parent node 610 and/or the child node 615 may prioritize communications with the wireless node 605 based at least in part on the second information (e.g., based at least in part on the change in the multiplexing capability of the wireless node 605). For example, the parent node 610 and/or the child node 615 may prioritize communications with the wireless node 605 as described in connection with FIG. 6.

As indicated above, FIG. 7 is provided as an example. Other examples may differ from what is described with respect to FIG. 7.

Figure 8:
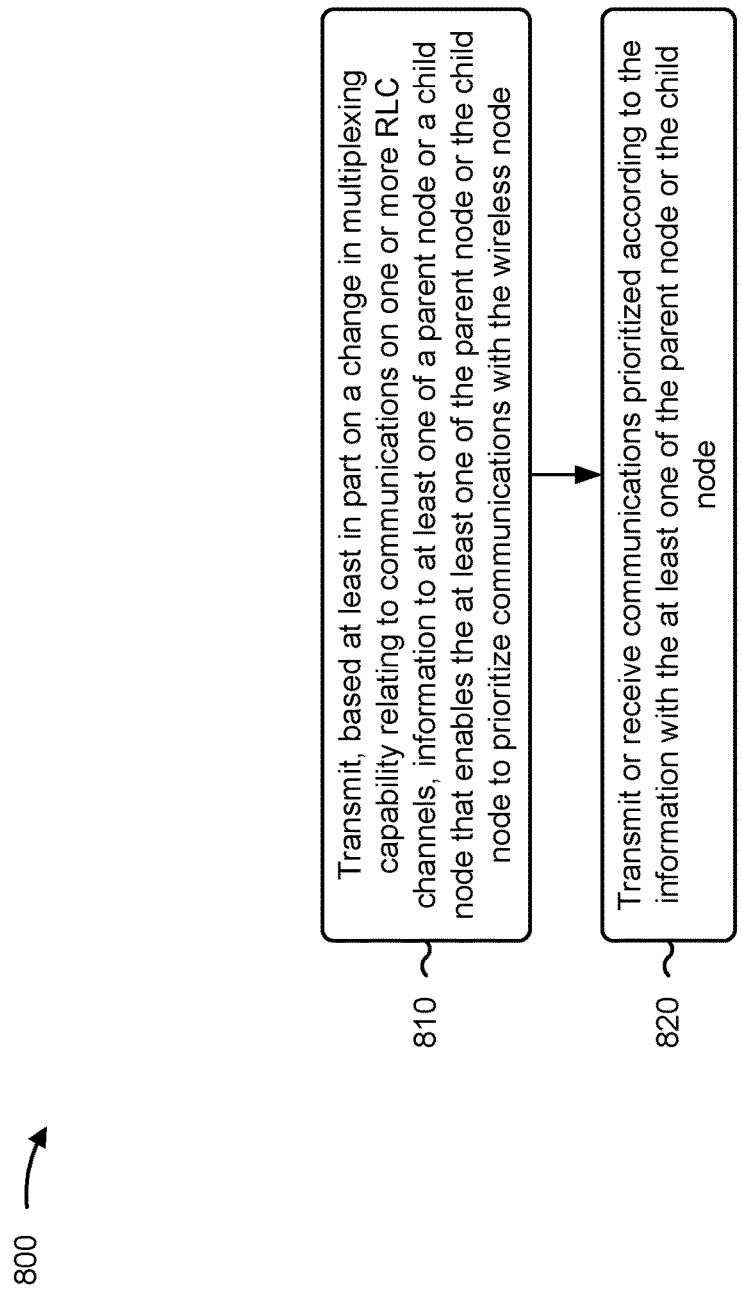
FIGS. 8 and 9 are diagrams illustrating an example process performed, for example, by a wireless node in a wireless multi-hop network, in accordance with the present disclosure.

FIG. 8 is a diagram illustrating an example process 800 performed, for example, by a wireless node in a wireless multi-hop network, in accordance with the present disclosure. Example process 800 is an example where the wireless node (e.g., a base station 110, a UE 120, an IAB node 410, a wireless node 605, a parent node 610, a child node 615, and/or the like) performs operations associated with scheduling coordination in an IAB network.

As shown in FIG. 8, in some aspects, process 800 may include transmitting, based at least in part on a change in multiplexing capability relating to communications on one or more RLC channels, information to at least one of a parent node or a child node that enables the at least one of the parent node or the child node to prioritize communications with the wireless node (block 810). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, based at least in part on a change in multiplexing capability relating to communications on one or more RLC channels, information to at least one of a parent node or a child node that enables the at least one of the parent node or the child node to prioritize communications with the wireless node, as described above.

As further shown in FIG. 8, in some aspects, process 800 may include transmitting or receiving communications prioritized according to the information with the at least one of the parent node or the child node (block 820). For example, the wireless node (e.g., using transmit processor 264, TX MIMO processor 266, MOD 254, antenna 252, controller/processor 280, memory 282, DEMOD 254, MIMO detector 256, receive processor 258, and/or the like) may transmit or receive communications prioritized according to the information with the at least one of the parent node or the child node, as described above.

Process 800 may include additional aspects, such as any single aspect or any combination of aspects described below and/or in connection with one or more other processes described elsewhere herein.

In a first aspect, the information indicates an association among a set of the one or more RLC channels.

In a second aspect, alone or in combination with the first aspect, the information indicates at least one of a spatial division multiplexing capability or a full duplexing capability of the wireless node for at least one of the one or more RLC channels.

In a third aspect, alone or in combination with one or more of the first and second aspects, process 800 includes receiving, from the parent node and based at least in part on transmitting the information, scheduling that modifies a release of soft resources or a timing of communications.

In a fourth aspect, alone or in combination with one or more of the first through third aspects, the information indicates an uplink buffer status of one or more child nodes of the wireless node.

In a fifth aspect, alone or in combination with one or more of the first through fourth aspects, process 800 includes receiving, from the parent node, other information that indicates a downlink buffer status of the parent node.

In a sixth aspect, alone or in combination with one or more of the first through fifth aspects, process 800 includes receiving, from the parent node, other information that indicates one or more scheduling options for the wireless node.

In a seventh aspect, alone or in combination with one or more of the first through sixth aspects, the information is based at least in part on other information received from the at least one of the parent node or the child node.

In an eighth aspect, alone or in combination with one or more of the first through seventh aspects, the information indicates that a set of rules, used by the child node to select data for transmission, is to be modified.

In a ninth aspect, alone or in combination with one or more of the first through eighth aspects, the information is transmitted to the at least one of the parent node or the child node via a central unit of the wireless multi-hop network.

In a tenth aspect, alone or in combination with one or more of the first through ninth aspects, the information indicates a rate at which the wireless node is capable of communicating with one or more child nodes of the wireless node.

In an eleventh aspect, alone or in combination with one or more of the first through tenth aspects, the rate relates to at least one of a particular RLC channel of the one or more RLC channels or a particular multiplexing mode of the wireless node.

In a twelfth aspect, alone or in combination with one or more of the first through eleventh aspects, the information is transmitted according to a configuration that provides a time interval for transmitting the information or a condition for transmitting the information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
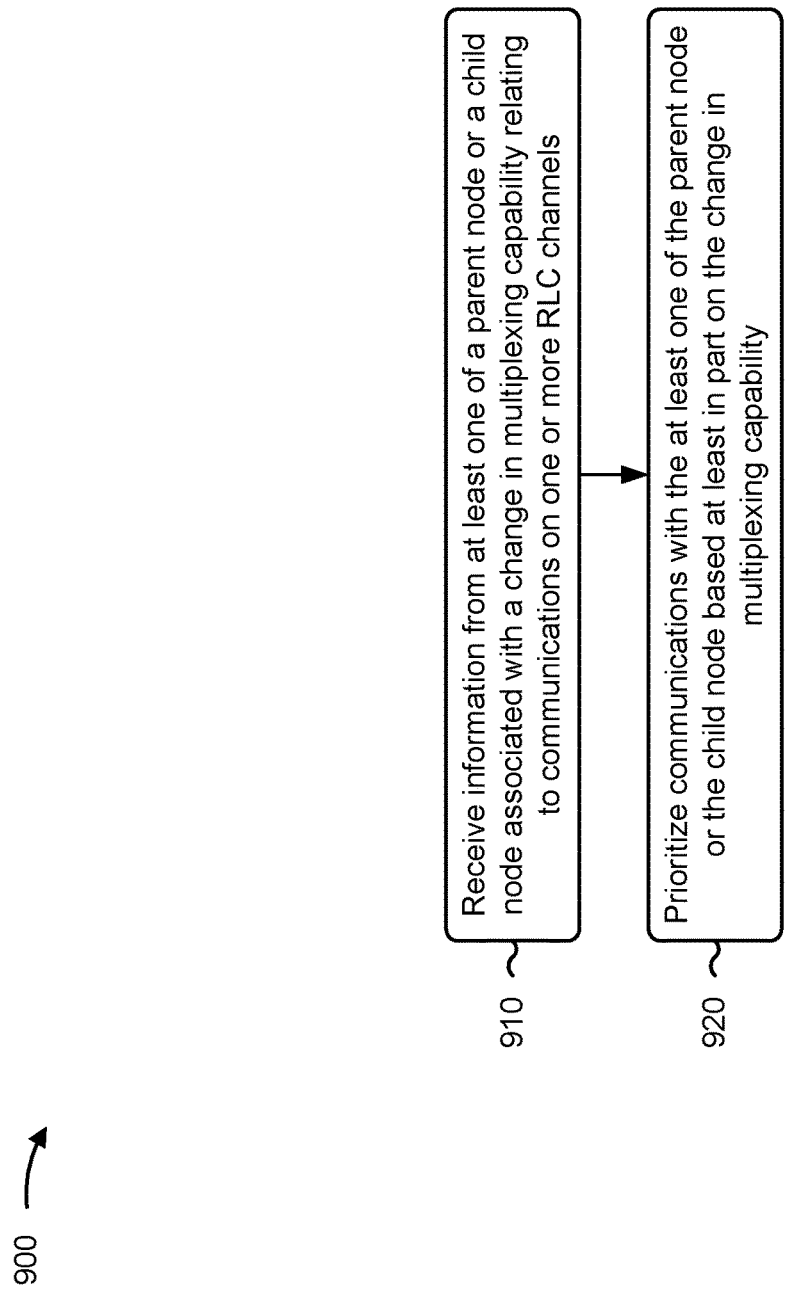

FIG. 9 is a diagram illustrating an example process 900 performed, for example, by a wireless node in a wireless multi-hop network, in accordance with the present disclosure. Example process 900 is an example where the wireless node (e.g., a base station 110, a UE 120, an IAB node 410, a wireless node 605, a parent node 610, a child node 615, and/or the like) performs operations associated with scheduling coordination in an IAB network.

As shown in FIG. 9, in some aspects, process 900 may include receiving information from at least one of a parent node or a child node associated with a change in multiplexing capability relating to communications on one or more RLC channels (block 910). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive information from at least one of a parent node or a child node associated with a change in multiplexing capability relating to communications on one or more RLC channels, as described above.

As further shown in FIG. 9, in some aspects, process 900 may include prioritizing communications with the at least one of the parent node or the child node based at least in part on the change in multiplexing capability (block 920). For example, the wireless node (e.g., using controller/processor 240, controller/processor 280, and/or the like) may prioritize communications with the at least one of the parent node or the child node based at least in part on the change in multiplexing capability, as described above.

Process 900 may include additional aspects, such as any single aspect or any combination of aspects described below and/or in connection with one or more other processes described elsewhere herein.

In a first aspect, the information indicates an association among a set of the one or more RLC channels.

In a second aspect, alone or in combination with the first aspect, the information indicates at least one of a spatial division multiplexing capability or a full duplexing capability of the child node for at least one of the one or more RLC channels.

In a third aspect, alone or in combination with one or more of the first and second aspects, process 900 includes transmitting scheduling that modifies a release of soft resources or a timing of communications based at least in part on prioritizing the communications.

In a fourth aspect, alone or in combination with one or more of the first through third aspects, the information indicates an uplink buffer status of one or more child nodes of the child node.

In a fifth aspect, alone or in combination with one or more of the first through fourth aspects, process 900 includes transmitting, to the child node, other information that indicates a downlink buffer status of the wireless node.

In a sixth aspect, alone or in combination with one or more of the first through fifth aspects, process 900 includes transmitting, to the child node, other information that indicates one or more scheduling options for the child node.

In a seventh aspect, alone or in combination with one or more of the first through sixth aspects, process 900 includes transmitting other information to the at least one of the parent node or the child node to enable the at least one of the parent node or the child node to determine the information that is received by the wireless node.

In an eighth aspect, alone or in combination with one or more of the first through seventh aspects, the information indicates that a set of rules, used by the wireless node to select data for transmission to the parent node, is to be modified.

In a ninth aspect, alone or in combination with one or more of the first through eighth aspects, the information is received from the at least one of the parent node or the child node via a central unit of the wireless multi-hop network.

In a tenth aspect, alone or in combination with one or more of the first through ninth aspects, the information indicates a rate at which the child node is capable of communicating with one or more child nodes of the child node.

In an eleventh aspect, alone or in combination with one or more of the first through tenth aspects, the rate relates to at least one of a particular RLC channel of the one or more RLC channels or a particular multiplexing mode of the child node.

In a twelfth aspect, alone or in combination with one or more of the first through eleventh aspects, the information is received according to a configuration that provides a time interval for transmitting the information or a condition for transmitting the information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
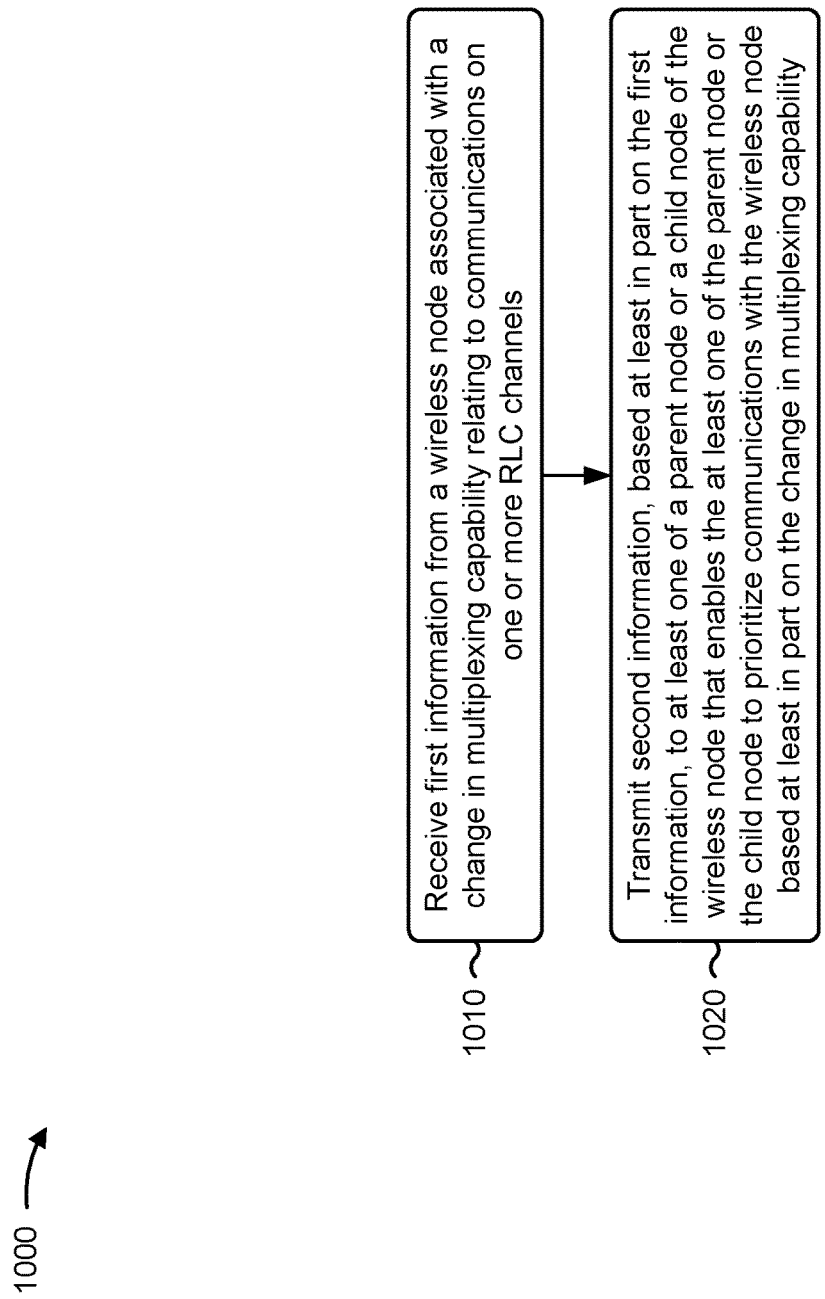
FIG. 10 is a diagram illustrating an example process performed, for example, by a central unit in a wireless multi-hop network, in accordance with the present disclosure.

FIG. 10 is a diagram illustrating an example process 1000 performed, for example, by a central unit, in accordance with various aspects of the present disclosure. Example process 1000 is an example where the central unit (e.g., a base station 110, a CU of IAB donor 405, central unit 620, and/or the like) performs operations associated with scheduling coordination in an IAB network.

As shown in FIG. 10, in some aspects, process 1000 may include receiving first information from a wireless node associated with a change in multiplexing capability relating to communications on one or more RLC channels (block 1010). For example, the central unit (e.g., using antenna 234, DEMOD 232, MIMO detector 236, receive processor 238, controller/processor 240, and/or the like) may receive first information from a wireless node associated with a change in multiplexing capability relating to communications on one or more RLC channels, as described above.

As further shown in FIG. 10, in some aspects, process 1000 may include transmitting second information, based at least in part on the first information, to at least one of a parent node or a child node of the wireless node that enables the at least one of the parent node or the child node to prioritize communications with the wireless node based at least in part on the change in multiplexing capability (block 1020). For example, the central unit (e.g., using controller/processor 240, transmit processor 220, TX MIMO processor 230, MOD 232, antenna 234, and/or the like) may transmit second information, based at least in part on the first information, to at least one of a parent node or a child node of the wireless node that enables the at least one of the parent node or the child node to prioritize communications with the wireless node based at least in part on the change in multiplexing capability, as described above.

Process 1000 may include additional aspects, such as any single aspect or any combination of aspects described below and/or in connection with one or more other processes described elsewhere herein.

In a first aspect, the first information indicates an association among a set of the one or more RLC channels.

In a second aspect, alone or in combination with the first aspect, the first information indicates at least one of a spatial division multiplexing capability or a full duplexing capability of the wireless node for at least one of the one or more RLC channels.

In a third aspect, alone or in combination with one or more of the first and second aspects, the first information indicates an uplink buffer status of one or more child nodes of the wireless node.

In a fourth aspect, alone or in combination with one or more of the first through third aspects, the first information is based at least in part on other information received from the at least one of the parent node or the child node.

In a fifth aspect, alone or in combination with one or more of the first through fourth aspects, the first information indicates that a set of rules, used by the child node to select data for transmission, is to be modified.

In a sixth aspect, alone or in combination with one or more of the first through fifth aspects, the first information indicates a rate at which the wireless node is capable of communicating with one or more child nodes of the wireless node.

In a seventh aspect, alone or in combination with one or more of the first through sixth aspects, the rate relates to at least one of a particular RLC channel of the one or more RLC channels or a particular multiplexing mode of the wireless node.

In an eighth aspect, alone or in combination with one or more of the first through seventh aspects, the first information is received according to a configuration that provides a time interval for transmitting the first information or a condition for transmitting the first information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a wireless node in a wireless multi-hop network, comprising: transmitting, based at least in part on a change in multiplexing capability relating to communications on one or more radio link control (RLC) channels, information to at least one of a parent node or a child node that enables the at least one of the parent node or the child node to prioritize communications with the wireless node; and transmitting or receiving communications prioritized according to the information with the at least one of the parent node or the child node.

Aspect 2: The method of Aspect 1, wherein the information indicates an association among a set of the one or more RLC channels.

Aspect 3: The method of any of Aspects 1-2, wherein the information indicates at least one of a spatial division multiplexing capability or a full duplexing capability of the wireless node for at least one of the one or more RLC channels.

Aspect 4: The method of any of Aspects 1-3, further comprising: receiving, from the parent node and based at least in part on transmitting the information, scheduling that modifies a release of soft resources or a timing of communications.

Aspect 5: The method of any of Aspects 1-4, wherein the information indicates an uplink buffer status of one or more child nodes of the wireless node.

Aspect 6: The method of any of Aspects 1-5, further comprising: receiving, from the parent node, other information that indicates a downlink buffer status of the parent node.

Aspect 7: The method of any of Aspects 1-6, further comprising: receiving, from the parent node, other information that indicates one or more scheduling options for the wireless node.

Aspect 8: The method of any of Aspects 1-7, wherein the information is based at least in part on other information received from the at least one of the parent node or the child node.

Aspect 9: The method of any of Aspects 1-8, wherein the information indicates that a set of rules, used by the child node to select data for transmission, is to be modified.

Aspect 10: The method of any of Aspects 1-9, wherein the information is transmitted to the at least one of the parent node or the child node via a central unit of the wireless multi-hop network.

Aspect 11: The method of any of Aspects 1-10, wherein the information indicates a rate at which the wireless node is capable of communicating with one or more child nodes of the wireless node.

Aspect 12: The method of Aspect 11, wherein the rate relates to at least one of a particular RLC channel of the one or more RLC channels or a particular multiplexing mode of the wireless node.

Aspect 13: The method of any of Aspects 1-12, wherein the information is transmitted according to a configuration that provides a time interval for transmitting the information or a condition for transmitting the information.

Aspect 14: A method of wireless communication performed by a wireless node in a wireless multi-hop network, comprising: receiving information from at least one of a parent node or a child node associated with a change in multiplexing capability relating to communications on one or more radio link control (RLC) channels; and prioritizing communications with the at least one of the parent node or the child node based at least in part on the change in multiplexing capability.

Aspect 15: The method of Aspect 14, wherein the information indicates an association among a set of the one or more RLC channels.

Aspect 16: The method of any of Aspects 14-15, wherein the information indicates at least one of a spatial division multiplexing capability or a full duplexing capability of the child node for at least one of the one or more RLC channels.

Aspect 17: The method of any of Aspects 14-16, further comprising: transmitting scheduling that modifies a release of soft resources or a timing of communications based at least in part on prioritizing the communications.

Aspect 18: The method of any of Aspects 14-17, wherein the information indicates an uplink buffer status of one or more child nodes of the child node.

Aspect 19: The method of any of Aspects 14-18, further comprising: transmitting, to the child node, other information that indicates a downlink buffer status of the wireless node.

Aspect 20: The method of any of Aspects 14-19, further comprising: transmitting, to the child node, other information that indicates one or more scheduling options for the child node.

Aspect 21: The method of any of Aspects 14-20, further comprising: transmitting other information to the at least one of the parent node or the child node to enable the at least one of the parent node or the child node to determine the information that is received by the wireless node.

Aspect 22: The method of any of Aspects 14-21, wherein the information indicates that a set of rules, used by the wireless node to select data for transmission to the parent node, is to be modified.

Aspect 23: The method of any of Aspects 14-22, wherein the information is received from the at least one of the parent node or the child node via a central unit of the wireless multi-hop network.

Aspect 24: The method of any of Aspects 14-23, wherein the information indicates a rate at which the child node is capable of communicating with one or more child nodes of the child node.

Aspect 25: The method of Aspect 24, wherein the rate relates to at least one of a particular RLC channel of the one or more RLC channels or a particular multiplexing mode of the child node.

Aspect 26: The method of any of Aspects 14-25, wherein the information is received according to a configuration that provides a time interval for transmitting the information or a condition for transmitting the information.

Aspect 27: A method of wireless communication performed by a central unit in a wireless multi-hop network, comprising: receiving first information from a wireless node associated with a change in multiplexing capability relating to communications on one or more radio link control (RLC) channels; and transmitting second information, based at least in part on the first information, to at least one of a parent node or a child node of the wireless node that enables the at least one of the parent node or the child node to prioritize communications with the wireless node based at least in part on the change in multiplexing capability.

Aspect 28: The method of Aspect 27, wherein the first information indicates an association among a set of the one or more RLC channels.

Aspect 29: The method of any of Aspects 27-28, wherein the first information indicates at least one of a spatial division multiplexing capability or a full duplexing capability of the wireless node for at least one of the one or more RLC channels.

Aspect 30: An apparatus for wireless communication at a device, comprising a processor; memory coupled with the processor; and instructions stored in the memory and executable by the processor to cause the apparatus to perform the method of one or more Aspects of Aspects 1-13.

Aspect 31: A device for wireless communication, comprising a memory and one or more processors coupled to the memory, the memory and the one or more processors configured to perform the method of one or more Aspects of Aspects 1-13.

Aspect 32: An apparatus for wireless communication, comprising at least one means for performing the method of one or more Aspects of Aspects 1-13.

Aspect 33: A non-transitory computer-readable medium storing code for wireless communication, the code comprising instructions executable by a processor to perform the method of one or more Aspects of Aspects 1-13.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 35: An apparatus for wireless communication at a device, comprising a processor; memory coupled with the processor; and instructions stored in the memory and executable by the processor to cause the apparatus to perform the method of one or more Aspects of Aspects 14-26.

Aspect 36: A device for wireless communication, comprising a memory and one or more processors coupled to the memory, the memory and the one or more processors configured to perform the method of one or more Aspects of Aspects 14-26.

Aspect 37: An apparatus for wireless communication, comprising at least one means for performing the method of one or more Aspects of Aspects 14-26.

Aspect 38: A non-transitory computer-readable medium storing code for wireless communication, the code comprising instructions executable by a processor to perform the method of one or more Aspects of Aspects 14-26.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 14-26.

Aspect 40: An apparatus for wireless communication at a device, comprising a processor; memory coupled with the processor; and instructions stored in the memory and executable by the processor to cause the apparatus to perform the method of one or more Aspects of Aspects 27-29.

Aspect 41: A device for wireless communication, comprising a memory and one or more processors coupled to the memory, the memory and the one or more processors configured to perform the method of one or more Aspects of Aspects 27-29.

Aspect 42: An apparatus for wireless communication, comprising at least one means for performing the method of one or more Aspects of Aspects 27-29.

Aspect 43: A non-transitory computer-readable medium storing code for wireless communication, the code comprising instructions executable by a processor to perform the method of one or more Aspects of Aspects 27-29.

Aspect 44: A non-transitory computer-readable medium storing a set of instructions for wireless communication, the set of instructions comprising one or more instructions that, when executed by one or more processors of a device, cause the device to perform the method of one or more Aspects of Aspects 27-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node in a wireless multi-hop network for wireless communication, comprising:
a memory; and
one or more processors, coupled to the memory, configured to:
transmit, based at least in a part on a change in a spatial division multiplexing capability relating to communications on one or more radio link control (RLC) channels, information to at least one of a parent node or a child node, wherein the information indicates the spatial division multiplexing capability of the wireless node for at least one of the one or more RLC channels and enables the at least one of the parent node or the child node to prioritize communications with the wireless node, wherein the change in the spatial division multiplexing capability is determined based at least in part on a movement of a group of user equipment associated with the wireless node; and
transmit or receive communications with the at least one of the parent node or the child node, wherein the communications are prioritized according to the information.

2. The wireless node of claim 1, wherein the information indicates an association among a set of the one or more RLC channels.

3. The wireless node of claim 1, wherein the one or more processors are further configured to:
receive, from the parent node and based at least in part on transmitting the information, scheduling that modifies a release of soft resources or a timing of communications.

4. The wireless node of claim 1, wherein the information indicates an uplink buffer status of one or more child nodes of the wireless node.

5. The wireless node of claim 1, wherein the one or more processors are further configured to:
receive, from the parent node, other information that indicates a downlink buffer status of the parent node.

6. The wireless node of claim 1, wherein the one or more processors are further configured to:
receive, from the parent node, other information that indicates one or more scheduling options for the wireless node.

7. The wireless node of claim 1, wherein the information indicates that a set of rules, used by the child node to select data for transmission, is to be modified.

8. The wireless node of claim 1, wherein the information is transmitted to the at least one of the parent node or the child node via a central unit of the wireless multi-hop network.

9. The wireless node of claim 1, wherein the information indicates a rate at which the wireless node is capable of communicating with one or more child nodes of the wireless node.

10. The wireless node of claim 9, wherein the rate relates to at least one of a particular RLC channel of the one or more RLC channels or a particular multiplexing mode of the wireless node.

11. A wireless node in a wireless multi-hop network for wireless communication, comprising:
a memory; and
one or more processors, operatively coupled to the memory, configured to:
receive information, based at least in part on the change in a spatial division multiplexing capability, from at least one of a parent node or a child node, wherein the information indicates the spatial division multiplexing capability relating to communications on one or more radio link control (RLC) channels wherein the change in the spatial division multiplexing capability is determined based at least in part on a movement of a group of user equipment associated with the at least one of the parent node or the child node; and
prioritize communications with the at least one of the parent node or the child node based at least in part on the change in the spatial division multiplexing capability.

12. The wireless node of claim 11, wherein the information indicates an association among a set of the one or more RLC channels.

13. The wireless node of claim 11, wherein the information indicates at least one of a spatial division multiplexing capability or a full duplexing capability of the child node for the at least one of the one or more RLC channels.

14. The wireless node of claim 11, wherein the one or more processors are further configured to:
transmit scheduling that modifies a release of soft resources or a timing of communications based at least in part on prioritizing the communications.

15. The wireless node of claim 11, wherein the information indicates an uplink buffer status of one or more child nodes of the child node.

16. The wireless node of claim 11, wherein the one or more processors are further configured to:
transmit, to the child node, other information that indicates a downlink buffer status of the wireless node.

17. The wireless node of claim 11, wherein the one or more processors are further configured to:
transmit, to the child node, other information that indicates one or more scheduling options for the child node.

18. The wireless node of claim 11, wherein the information indicates that a set of rules, used by the wireless node to select data for transmission to the parent node, is to be modified.

19. The wireless node of claim 11, wherein the information is received from the at least one of the parent node or the child node via a central unit of the wireless multi-hop network.

20. The wireless node of claim 11, wherein the information indicates a rate at which the child node is capable of communicating with one or more child nodes of the child node.

21. The wireless node of claim 20, wherein the rate relates to at least one of a particular RLC channel of the one or more RLC channels or a particular multiplexing mode of the child node.

22. A central unit in a wireless multi-hop network for wireless communication, comprising:
a memory; and
one or more processors, operatively coupled to the memory, configured to:
receive first information from a wireless node based at least in part on a change in the spatial division multiplexing capability, wherein the first information indicates the spatial division multiplexing capability relating to communications on one or more radio link control (RLC) channels, and wherein the change in the spatial division multiplexing capability is determined based at least in part on a movement of a group of user equipment associated with the wireless node; and
transmit second information, based at least in part on the first information, to at least one of a parent node or a child node of the wireless node, wherein the second information enables the at least one of the parent node or the child node to prioritize communications with the wireless node based at least in part on the change in the spatial division multiplexing capability.

23. The central unit of claim 22, wherein the first information indicates an association among a set of the one or more RLC channels.

24. The central unit of claim 22, wherein the first information indicates a full duplexing capability of the wireless node for at least one of the one or more RLC channels.

25. A method of wireless communication performed by a wireless node in a wireless multi-hop network, comprising:
transmitting, based at least in part on a change in a spatial division multiplexing capability relating to communications on one or more radio link control (RLC) channels, information to at least one of a parent node or a child node, wherein the information enables the at least one of the parent node or the child node to prioritize communications with the wireless node, wherein the change in the spatial division multiplexing capability is determined based at least in part on a movement of a group of user equipment associated with the wireless node; and
transmitting or receiving communications with the at least one of the parent node or the child node, wherein the communications are prioritized according to the information.

26. The method of claim 25, wherein the information indicates an association among a set of the one or more RLC channels.

27. The method of claim 25, wherein the information indicates at least one of a spatial division multiplexing capability or a full duplexing capability of the wireless node for at least one of the one or more RLC channels.

28. The method of claim 25, further comprising:
receiving, from the parent node and based at least in part on transmitting the information, scheduling that modifies a release of soft resources or a timing of communications.

29. The method of claim 25, wherein the information indicates that a set of rules, used by the child node to select data for transmission, is to be modified.

* * * * *